United States Patent
Kim et al.

(10) Patent No.: US 10,219,176 B2
(45) Date of Patent: Feb. 26, 2019

(54) METHOD FOR TRANSMITTING AND RECEIVING SIGNAL IN WIRELESS LOCAL AREA NETWORK SYSTEM AND DEVICE FOR THE SAME

(71) Applicant: LG ELECTRONICS INC., Seoul (KR)

(72) Inventors: Jinmin Kim, Seoul (KR); Sungjin Park, Seoul (KR); Kyungtae Jo, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 10 days.

(21) Appl. No.: 15/666,485

(22) Filed: Aug. 1, 2017

(65) Prior Publication Data

US 2018/0041918 A1 Feb. 8, 2018

Related U.S. Application Data

(60) Provisional application No. 62/369,774, filed on Aug. 2, 2016, provisional application No. 62/384,200, filed on Sep. 7, 2016.

(51) Int. Cl.

| H04W 28/06 | (2009.01) |
| H04L 12/709 | (2013.01) |
| H04B 7/06 | (2006.01) |
| H04L 27/26 | (2006.01) |
| H04L 1/00 | (2006.01) |

(Continued)

(52) U.S. Cl.
CPC .......... *H04W 28/06* (2013.01); *H04B 7/0613* (2013.01); *H04L 1/00* (2013.01); *H04L 1/0057* (2013.01); *H04L 5/001* (2013.01); *H04L 5/0023* (2013.01); *H04L 27/2656* (2013.01); *H04L 45/245* (2013.01); *H04L 5/0007* (2013.01);

(Continued)

(58) Field of Classification Search
CPC . H04B 7/0613; H04L 27/2656; H04L 45/245; H04L 5/0007; H04L 5/0037; H04W 28/06; H04W 72/1215
See application file for complete search history.

(56) References Cited

U.S. PATENT DOCUMENTS

| 2007/0041458 A1* | 2/2007 | Hocevar ............... H04L 1/0041 375/260 |
| 2014/0226752 A1* | 8/2014 | Kim ..................... H04L 1/0042 375/296 |

(Continued)

*Primary Examiner* — Khaled M Kassim
(74) *Attorney, Agent, or Firm* — Lee, Hong, Degerman, Kang & Waimey PC

(57) ABSTRACT

The present invention relates to a method performed by a station (STA) for transmitting and receiving signals in a wireless local area network (WLAN) system. More particularly, according to the present invention, when the STA performs signal transmission and reception through channel aggregation, the STA can transmit a signal by mapping spatial stream sequences of each spatial stream in individual channels based on a plurality of pieces of MCS information indicated by a transmitted and received header field or, on the contrary, by obtaining output bit values of a plurality of encoders from spatial stream sequences received through spatial streams in the individual channels. That is, the present invention is directed to a method for transmitting and receiving signals in the above-described manner and device for the same.

17 Claims, 10 Drawing Sheets

(51) Int. Cl.
    *H04L 5/00*      (2006.01)
    *H04W 72/12*     (2009.01)
(52) U.S. Cl.
    CPC ........ *H04L 5/0037* (2013.01); *H04L 27/2602* (2013.01); *H04W 72/1215* (2013.01)

(56) References Cited

U.S. PATENT DOCUMENTS

| | | | |
|---|---|---|---|
| 2016/0204912 A1* | 7/2016 | Sun | H04L 27/2613 375/302 |
| 2016/0204969 A1* | 7/2016 | Zhu | H04L 27/3405 375/261 |
| 2017/0033958 A1* | 2/2017 | Eitan | H04L 25/0202 |
| 2017/0134126 A1* | 5/2017 | Sanderovich | H04L 5/0044 |
| 2018/0183909 A1* | 6/2018 | Cariou | H04L 69/324 |

* cited by examiner

METHOD FOR TRANSMITTING AND RECEIVING SIGNAL IN WIRELESS LOCAL AREA NETWORK SYSTEM AND DEVICE FOR THE SAME

Pursuant to 35 U.S.C. § 119(e), this application claims the benefit of U.S. Provisional Patent Application Nos. 62/369,774, filed on Aug. 2, 2016 and 62/384,200, filed on Sep. 7, 2016, the contents of which are all hereby incorporated by reference herein in their entirety.

BACKGROUND OF THE INVENTION

Field of the Invention

The present invention relates to a method for transmitting and receiving signals in a wireless local area network (WLAN) system. More particularly, according to the present invention, when a station (STA) performs signal transmission and reception through channel aggregation, the STA can transmit a signal by mapping spatial stream sequences of each spatial stream in individual channels based on a plurality of pieces of MCS information indicated by a transmitted and received header field or, on the contrary, by obtaining output bit values of a plurality of encoders from spatial stream sequences received through spatial streams in the individual channels. That is, the present invention relates to a method for transmitting and receiving signals in the above-described manner and device for the same.

Discussion of the Related Art

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

Meanwhile, IEEE 802.11ad defines performance enhancement for high-speed throughput in the 60 GHz band, and IEEE 802.11ay, for introducing channel bonding and MIMO technology to IEEE 802.11ad systems for the first time, is being discussed.

SUMMARY OF THE INVENTION

According to 11ay system to which the present invention can be applied, an STA can use a single user-multi input multi output (SU-MIMO) transmission method by bonding a single channel or a plurality of channel or aggregate the plurality of channels to transmit a signal.

Proposed are a method for mapping spatial stream sequences transmitted in each spatial stream and a signal transmission and reception method based on the mapped spatial stream sequences when an STA transmits and receives signals in one or more spatial streams based on at least one piece of MCS (modulation and coding scheme) information.

In a first aspect of the present invention, a method performed by a first station (STA) for transmitting a signal to a second STA through channel aggregation of a first channel and a second channel in a wireless local area network (WLAN) system may include: transmitting a header field including 2*N (where N is a positive integer) pieces of modulation and coding scheme (MCS) information to the second STA; mapping output bit values of N low-density parity-check (LDPC) encoders corresponding to N pieces of MCS information among the 2*N pieces of MCS information to spatial stream sequences of each spatial stream in the first channel based on a mapping table defined by a relationship between the number of spatial streams in the first channel and the integer N; mapping output bit values of N LDPC encoders corresponding to remaining N pieces of MCS information among the 2*N pieces of MCS information to spatial stream sequences of each spatial stream in the second channel based on a mapping table defined by a relationship between the number of spatial streams in the second channel and the integer N; and transmitting the mapped spatial stream sequences through spatial streams in each corresponding channel to the second STA.

In a second aspect of the present invention, a station (STA) device for transmitting a signal through channel aggregation of a first channel and a second channel in a wireless local area network (WLAN) system may include: a transceiver configured to transmit and receive signals to and from a different STA device with at least one radio frequency (RF) chain; and a processor configured to be connected to the transceiver and process the signals transmitted and received to and from the different STA device. In this case, the processor may be configured to: transmit a header field including 2*N (where N is a positive integer) pieces of modulation and coding scheme (MCS) information to the different STA; map output bit values of N low-density parity-check (LDPC) encoders corresponding to N pieces of MCS information among the 2*N pieces of MCS information to spatial stream sequences of each spatial stream in the first channel based on a mapping table defined by a relationship between the number of spatial streams in the first channel and the integer N; map output bit values of N LDPC encoders corresponding to remaining N pieces of MCS information among the 2*N pieces of MCS information to spatial stream sequences of each spatial stream in the second channel based on a mapping table defined by a relationship between the number of spatial streams in the second channel and the integer N; and transmit the mapped spatial stream sequences through spatial streams in each corresponding channel to the different STA.

In this case, a maximum number of spatial streams in each channel may be set to 4.

In addition, the number of the spatial streams in the first channel may be set to be equal to that in the second channel.

In this case, the first STA (or the STA device) may further transmit information on the number of common spatial streams as information indicating the number of spatial streams in each channel to the second STA (or the other STA device).

Alternatively, the first STA (or the STA device) may further transmit information on the numbers of spatial streams in the individual channels as information indicating the number of spatial streams in each channel to the second STA (or the other STA device).

For example, the integer N may be set to 2. In this case, depending on whether the number of the spatial streams in either the first or second channel is an odd number or an even number, the number of spatial streams to which an output bit value of a first LDPC encoder corresponding to first MCS information of two pieces of MCS information corresponding to either the first or second channel is mapped may be either equal to or different from that to which an output bit value of a second LDPC encoder corresponding to second MCS information of the two pieces of MCS information corresponding to the either first or second channel is mapped.

More particularly, when the integer N is 2 and the number (Nss) of the spatial streams in either the first or second channel is the odd number, the output bit value of the first LDPC encoder corresponding to the first MCS information of the two pieces of MCS information corresponding to either the first or second channel may be mapped to $$\left\lfloor \frac{N_{ss}}{2} \right\rfloor$$

spatial streams, and the output bit value of the second LDPC encoder corresponding to the second MCS information of the two pieces of MCS information corresponding to either the first or second channel may be mapped to $$\left\lfloor \frac{N_{ss}}{2} \right\rfloor + 1$$

spatial streams, where $\lfloor x \rfloor$ indicates an integer equal to or smaller than x.

Alternatively, when the integer N is 2 and the number (Nss) of the spatial streams in either the first or second channel is the even number, the output bit value of the first LDPC encoder corresponding to the first MCS information of the two pieces of MCS information corresponding to either the first or second channel and the output bit value of the second LDPC encoder corresponding to the second MCS information of the two pieces of MCS information corresponding to the either the first or second channel may be mapped to $$\left\lfloor \frac{N_{ss}}{2} \right\rfloor$$

spatial streams.

In the examples, when the number of spatial streams in each channel to which the output bit value of the first LDPC encoder or the output bit value of the second LDPC encoder is mapped is equal to or greater than 2, the output bit value of each of the first and second LDPC encoders may be mapped to the two or more spatial streams in each channel according to a round robin method.

In a third aspect of the present invention, a method performed by a first station (STA) for receiving a signal from a second STA through channel aggregation of a first channel and a second channel in a wireless local area network (WLAN) system may include: receiving a header field including 2*N (where N is a positive integer) pieces of modulation and coding scheme (MCS) information from the second STA; receiving spatial stream sequences in each channel through spatial streams in each corresponding channel from the second STA; obtaining output bit values of N low-density parity-check (LDPC) encoders corresponding to N pieces of MCS information among the 2*N pieces of MCS information from spatial stream sequences of each spatial stream in the first channel based on a mapping table defined by a relationship between the number of spatial streams in the first channel and the integer N; and obtaining output bit values of N LDPC encoders corresponding to remaining N pieces of MCS information among the 2*N pieces of MCS information from spatial stream sequences of each spatial stream in the second channel based on a mapping table defined by a relationship between the number of spatial streams in the second channel and the integer N.

In a fourth aspect of the present invention, a station (STA) device for receiving a signal through channel aggregation of a first channel and a second channel in a wireless local area network (WLAN) system may include: a transceiver configured to transmit and receive signals to and from a different STA device with at least one radio frequency (RF) chain; and a processor configured to be connected to the transceiver and process the signals transmitted and received to and from the different STA device. In this case, the processor may be configured to: receive a header field including 2*N (where N is a positive integer) pieces of modulation and coding scheme (MCS) information from the different STA; receive spatial stream sequences in each channel through spatial streams in each corresponding channel from the different STA; obtain output bit values of N low-density parity-check (LDPC) encoders corresponding to N pieces of MCS information among the 2*N pieces of MCS information from spatial stream sequences of each spatial stream in the first channel based on a mapping table defined by a relationship between the number of spatial streams in the first channel and the integer N; and obtain output bit values of N LDPC encoders corresponding to remaining N pieces of MCS information among the 2*N pieces of MCS information from spatial stream sequences of each spatial stream in the second channel based on a mapping table defined by a relationship between the number of spatial streams in the second channel and the integer N.

In this case, a maximum number of spatial streams in each channel may be set to 4.

In addition, the number of the spatial streams in the first channel may be set to be equal to that in the second channel.

In this case, the first STA (or the STA device) may further receive information on the number of common spatial streams as information indicating the number of spatial streams in each channel from the second STA (or the different STA device).

Alternatively, the first STA (or the STA device) may further receive information on the numbers of spatial streams in the individual channels as information indicating the number of spatial streams in each channel from the second STA (or the different STA device).

According to the above-mentioned features, an STA can transmit and receive signals through one or more spatial streams based on at least one piece of MCS information.

The effects that may be obtained by the present invention are not limited to the above-mentioned effects, and other effects not mentioned above will be clearly understood by those skilled in the art from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, a detailed description will be given of the introduction of the concept of a downlink oriented channel, and a method and apparatus for conducting communication using a downlink oriented channel in a high-density Wireless Local Area Network (WLAN) system.

1. Wireless LAN (WLAN) System 1-1. Generals of WLAN System

Figure 1:
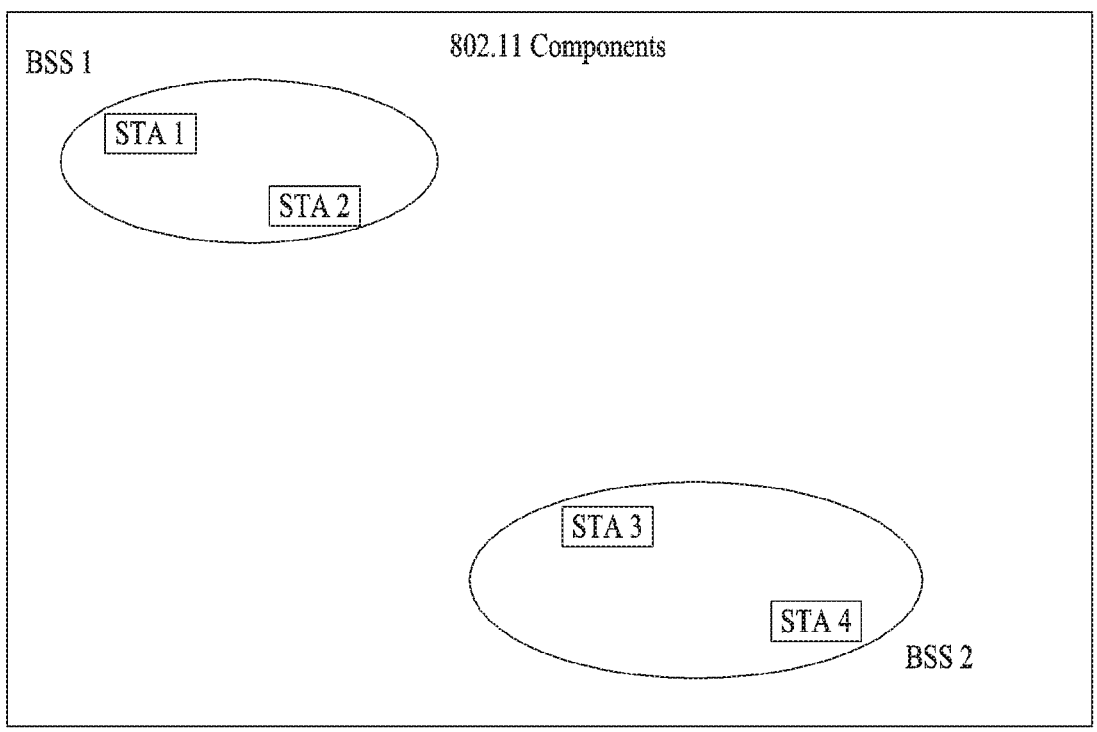
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
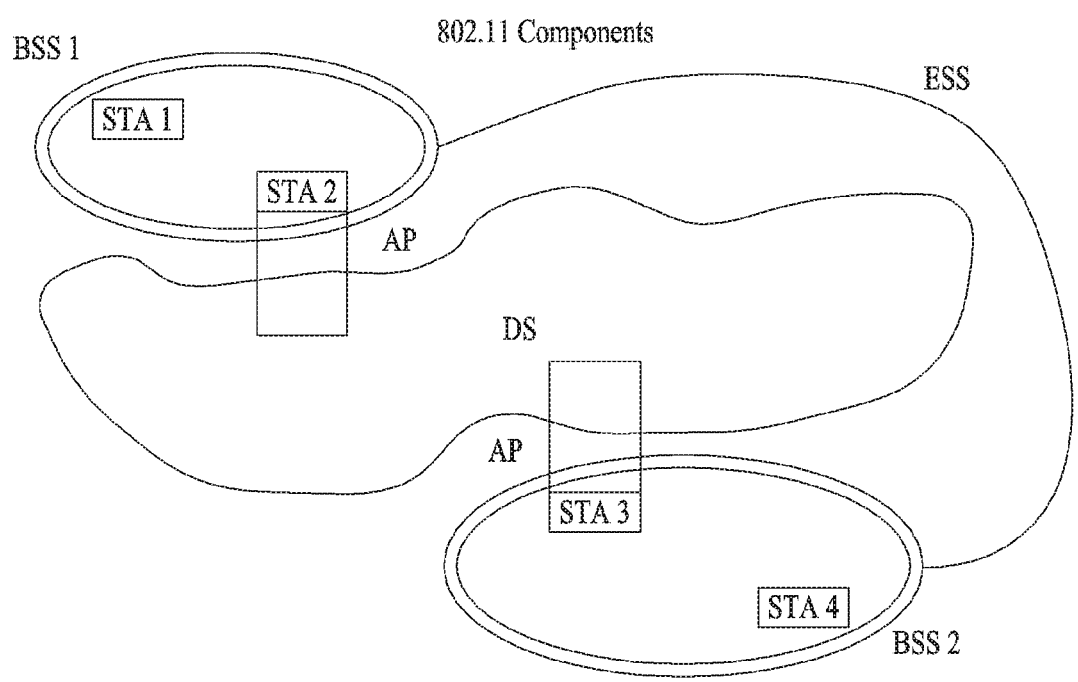
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above, a method of channel bonding in the WLAN system will be described.

1-2. Channel Bonding in WLAN System

Figure 3:
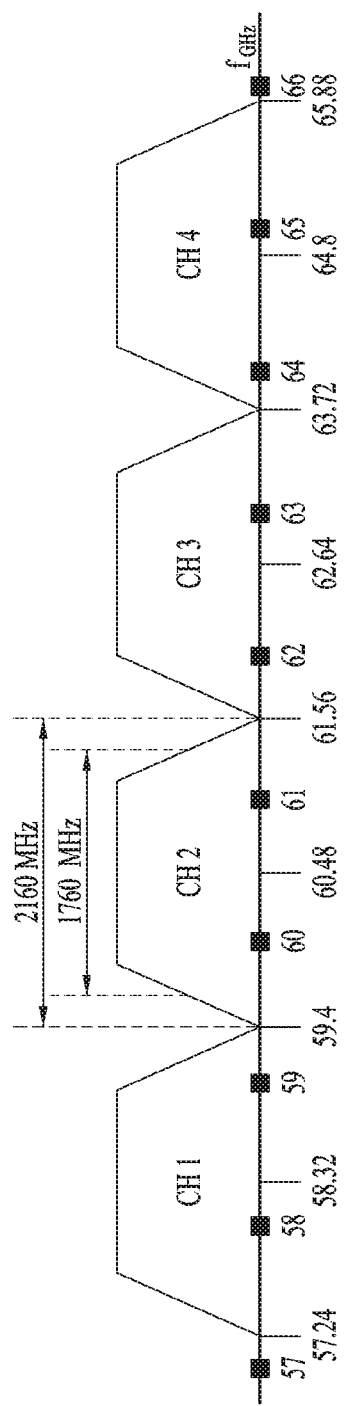
FIG. 3 is a diagram illustrating a channel in a 60 GHz band for explaining a channel bonding operation according to an embodiment of the present invention.

FIG. 3 is a diagram illustrating a channel in a 60 GHz band for explaining a channel bonding operation according to an embodiment of the present invention.

As shown in FIG. 3, four channels may be configured in the 60 GHz band, and the typical channel bandwidth may be 2.16 GHz. The ISM band (57 GHz to 66 GHz) available at 60 GHz may be specified differently for different countries. In general, channel 2 of the channels shown in FIG. 3 is available in all regions and may be used as a default channel. Most of the regions, except Australia, may use channels 2 and 3, which may be utilized for channel bonding. However, the channels used for channel bonding may vary, and the present invention is not limited to a specific channel.

Figure 4:
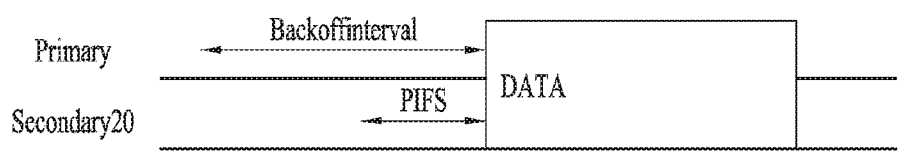
FIG. 4 illustrates a basic method of performing channel bonding in a WLAN system.

FIG. 4 illustrates a basic method of performing channel bonding in a WLAN system.

The example of FIG. 4 illustrates the operation of 40 MHz channel bonding performed by combining two 20 MHz channels in the IEEE 802.11n system. For IEEE 802.11ac, 40/80/160 MHz channel bonding may be performed.

The two channels exemplarily shown in FIG. 4 include a primary channel and a secondary channel, and the STA may review the channel status of the primary channel of the two channels in the CSMA/CA manner. If the secondary channel is idle for a predetermined time (e.g., PIFS) while the primary channel is idle during a certain backoff interval and the backoff count becomes 0, the STA may transmit data by bonding the primary channel and the secondary channel.

In the case where channel bonding is performed based on contention as shown in FIG. 4, channel bonding is allowed only when the secondary channel remains idle for a predetermined time at the time when the backoff count for the primary channel expires, and therefore the application of channel bonding is very limited, and it is difficult to flexibly cope with the media situation.

Accordingly, in one aspect of the present invention, an AP may transmit scheduling information to STAs to perform access based on scheduling. Meanwhile, in another aspect of the present invention, channel access may be performed based on the above-described scheduling or on contention independently of the above-described scheduling. In yet another aspect of the present invention, communication may be performed based on beamforming using a spatial sharing technique.

1-3. Beacon Interval Configuration

Figure 5:
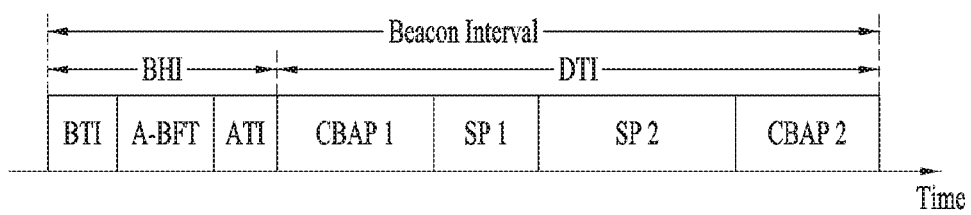
FIG. 5 is a diagram illustrating configuration of a beacon interval.

FIG. 5 is a diagram illustrating configuration of a beacon interval.

In 11ad-based DMG BSS systems, the media time may be divided into beacon intervals. The sub-intervals within a beacon interval may be referred to as access periods. Different access intervals within one beacon interval may have different access rules. The information on the access intervals may be transmitted to a non-AP STA or a non-PCP by the AP or Personal Basic Service Set Control Point (PCP).

As shown in FIG. 5, one beacon interval may include one beacon header interval (BHI) and one data transfer interval (DTI). The BHI may include a beacon transmission interval (BTI), an association beamforming training (A-BFT) interval, and an announcement transmission interval (ATI) as shown in FIG. 4.

The BTI refers to an interval during which one or more DMG beacon frames may be transmitted. The A-BFT interval refers to an interval during which beamforming training is performed by an STA that has transmitted the DMG beacon frame during the preceding BTI. The ATI refers to a request-response-based management access interval between a PCP/AP and a non-PCP/non-AP STA.

Meanwhile, the data transfer interval (DTI) is an interval during which frame exchange is performed between STAs, and may be allocated one or more Contention Based Access Periods (CBAPs) and one or more service periods (SPs) as shown in FIG. 5. Although FIG. 5 illustrates an example of allocation of two CBAPs and two SPs, this is illustrative and not restrictive.

Hereinafter, the physical layer configuration in a WLAN system to which the present invention is applied will be described in detail.

1-4. Physical Layer Configuration

It is assumed that the following three different modulation modes may be provided in the WLAN system according to an embodiment of the present invention.

TABLE 1

| PHY | MCS | Note |
|---|---|---|
| Control PHY | 0 | |
| Single carrier PHY (SC PHY) | 1 ... 12 25 ... 31 | (low power SC PHY) |
| OFDM PHY | 13 ... 24 | |

Such modulation modes may be used to satisfy different requirements (e.g., high throughput or stability). Depending on the system, only some of these modes may be supported.

Figure 6:
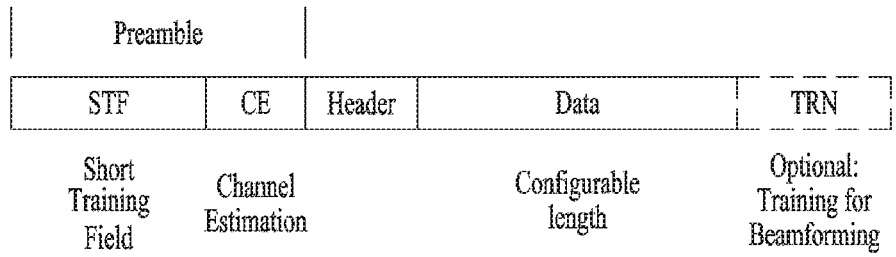
FIG. 6 is a diagram illustrating a physical configuration of an existing radio frame.

FIG. 6 is a diagram illustrating a physical configuration of an existing radio frame.

It is assumed that all the Directional Multi-Gigabit (DMG) physical layers include fields as shown in FIG. 6 in common. However, depending on the respective modes, physical layers may have a different method of defining individual fields and use a different modulation/coding scheme.

As shown in FIG. 6, the preamble of a radio frame may include a Short Training Field (STF) and Channel Estimation (CE). In addition, the radio frame may include a header and a data field as payload, and selectively include a TRN (Training) field for beamforming.

Figure 7:
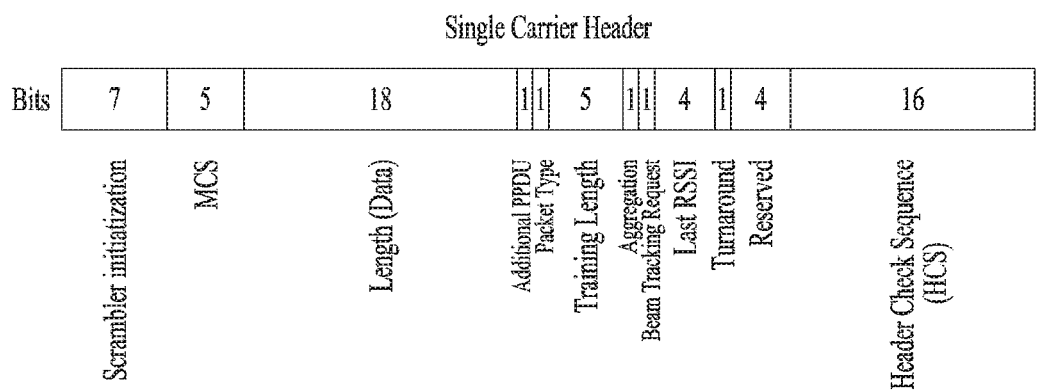
FIGS. 7 and 8 are diagrams illustrating configuration of the header field of the radio frame of FIG. 6.
Figures 8, 9:
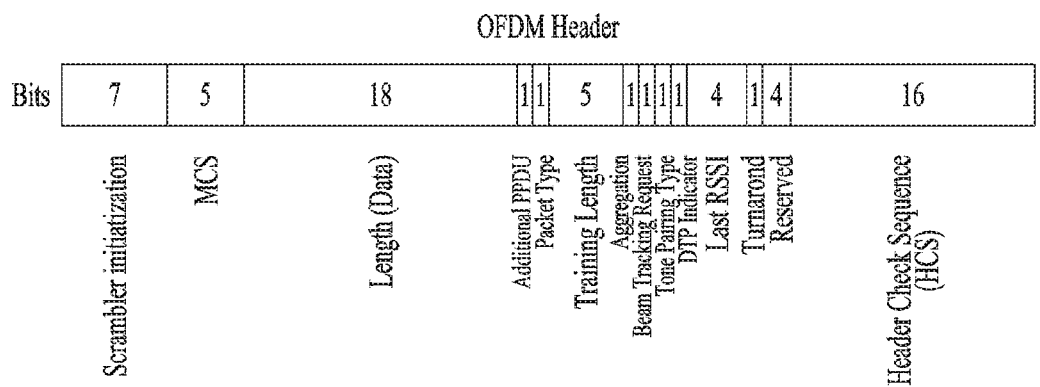
FIG. 9 is a diagram showing a PPDU structure applicable to the present invention.

FIGS. 7 and 8 are diagrams illustrating configuration of the header field of the radio frame of FIG. 6.

Specifically, FIG. 7 illustrates a case where a Single Carrier (SC) mode is used. In the SC mode, the header may include information indicating an initial value of scrambling, a Modulation and Coding Scheme (MCS), information indicating the length of data, information indicating the presence or absence of an additional Physical Protocol Data Unit (PPDU), a packet type, a training length, an aggregation status, a beam training request status, a last Received Signal Strength Indicator (RSSI), a truncation status, and a Header Check Sequence (HCS). In addition, as shown in FIG. 7, the header has 4 reserved bits. The reserved bits may be utilized in the following description.

FIG. 8 specifically illustrates configuration of a header in a case where the OFDM mode is applied. The OFDM header may include information indicating an initial value of scrambling, an MCS, information indicating the length of data, information indicating the presence or absence of additional PPDU, a packet type, a training length, an aggregation status, a beam training request status, a last RSSI, a truncation status, and an HCS. In addition, as shown in FIG. 8, the header has 2 reserved bits. The reserved bits may be utilized in the following description as in the case of FIG. 7.

As described above, the IEEE 802.11ay system is considering introduction of channel bonding and MIMO technology in the legacy 11ad system for the first time. In order to implement channel bonding and MIMO in 11ay, a new PPDU structure is needed. In other words, the existing 11ad PPDU structure has limitations in supporting legacy UEs and implementing channel bonding and MIMO.

For this, a legacy preamble for supporting a legacy UE and a new field for a 11ay UE following a legacy header field may be defined, and channel bonding and MIMO may be supported through the newly defined field.

FIG. 9 is a diagram showing a PPDU structure according to a preferred embodiment of the present invention. In FIG. 9, the abscissa may correspond to the time domain, and the ordinate may correspond to the frequency domain.

When two or more channels are bonded, a frequency band (for example, a 400 MHz band) may exist between frequency bands (e.g., 1.83 GHz) used in the respective channels. In the mixed mode, a legacy preamble (legacy STF, legacy CE) is transmitted in duplicate through each channel. In an embodiment of the present invention, transmitting the new STF and CE field (gap filling) preamble through the 400 MHz band between the channels along with transmission of the legacy preamble may be considered.

In this case, as shown in FIG. 9, in the PPDU structure according to the present invention, ay STF, ay CE, ay header B, and payload are transmitted over broadband after a legacy preamble, a legacy header and an ay header A. Therefore, the ay header, ay Payload field, and the like to be transmitted after the header field may be transmitted through channels used for bonding. In order to distinguish the ay header from the legacy header, the ay header may be referred to as an enhanced directional multi-gigabit (EDMG) header, or "ay header" and "EDMG header" may be interchangeably used.

For example, a total of six channels (2.16 GHz) may be present in 11ay, and up to four channels may be bonded and transmitted to a single STA. Thus, the ay header and the ay payload may be transmitted over bandwidths of 2.16 GHz, 4.32 GHz, 6.48 GHz, and 8.64 GHz.

Alternatively, the PPDU format used when the legacy preamble is repeatedly transmitted without performing the gap-filling described above may also be considered.

In this case, the gap-filling is not performed, and thus the ay STF, ay CE, and ay header B are transmitted in a wideband after the legacy preamble, legacy header, and ay header A, without the GF-STF and GF-CE field indicated by the dotted line in FIG. 9.

Figure 10:
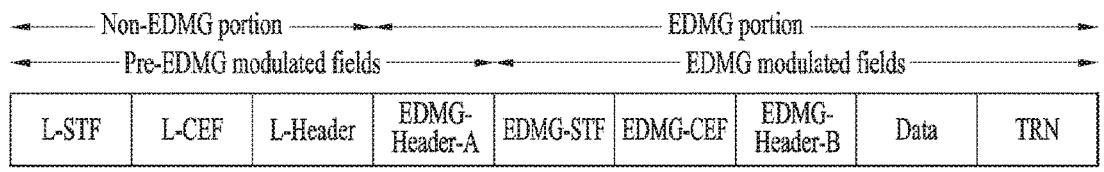
FIG. 10 is a diagram briefly illustrating a PPDU structure applicable to the present invention.

FIG. 10 is a diagram briefly illustrating a PPDU structure applicable to the present invention. That is, the above-mentioned PPDU can be briefly depicted as shown in FIG. 10.

As shown in FIG. 10, the PPDU format applicable to the flay system may include L-STF, L-CEF, L-Header, EDMG-Header-A, EDMG-STF, EDMG-CEF, EDMG-Header-B, Data, and TRN fields. In addition, such fields may be selectively included depending on a type of PPDU (e.g., SU PPDU, MU PPDU, etc.).

In this case, a portion including the L-STF, L-CEF, and L-header fields can be named a non-EDMG portion and the rest of the PPDU format can be named an EDMG portion. Moreover, the L-STF, L-CEF, L-Header, and EDMG-Header-A fields can be named pre-EDMG modulated fields and the remaining portion can be named EDMG modulated fields.

2. Configuration of PHY Header Applicable to Invention

Hereinafter, the configuration of the PHY header (e.g., (EDMG) Header-A) for supporting the MIMO and channel bonding in the 11ay system to which the present invention can be applied will be described in detail.

Before describing contents of the EDMG Header-A field of FIG. 10, the SU-MIMO and channel bonding in the 11ay system to which the present invention is applicable will be described first. Thereafter, the contents of the EDMG Header-A field, which are devised to support the SU-MIMO and channel bonding, will be described later.

(1) SU-MIMO

First, the 11ay system to which the present invention can be applied supports up to 8 streams. Thus, a different MCS can be applied to each stream in the 11ay system according to the present invention.

However, when different MCSs are applied to individual streams, it has an advantage of improving link throughput but there may be disadvantages in that hardware complexity increases due to an increase in the number of LDPC encoders/decoders in accordance with different coding rates and signaling overhead increases due to feedback for each stream.

To overcome the disadvantages, the present invention proposes a method of applying the same MCS to at least one stream instead of applying a different MCS to each stream. For example, at least one stream can have the same MCS by limiting the number of different applicable MCSs to up to two or four. In other words, according to the present invention, when the 11ay system supports 8 streams, some of the 8 streams can have the same MCS by limiting the number of MCSs that can be applied to the 8 streams to up to two or four.

(2) Channel Aggregation (Bonding)

The 11ay system to which the present can be applied supports the channel aggregation or bonding. Thus, even when a specific STA does not have a capability of supporting wide bandwidth channel bonding, the STA can be configured to support 2-channel aggregation using hardware of the existing DMG device, thereby easily improving throughput. That is, the channel aggregation can show performance similar to that of the channel bonding with low cost and complexity.

In addition, the 11ay system to which the present invention is applicable can support not only the aforementioned 2-channel aggregation but also 3-channel or 4-channel aggregation. That is, the STA can support the 3-channel or 4-channel aggregation by using three or four pieces of hardware of the exiting DMG device. Further, although the present invention will be described based on the 2-channel aggregation, it is apparent that the invention is not limited thereto.

When an STA uses a single DMG device or modems several times or a plurality of DMG devices or modems for the channel aggregation, each DMG device or modem can independently perform encoding/decoding on data without an increase in hardware complexity. Therefore, the present invention proposes a method of separately indicating an MCS for channel aggregation in case of use of the channel aggregation.

In addition, the channel aggregation proposed in the present invention includes not only aggregation of contiguous channels but also aggregation of non-contiguous channels. If the flay system in accordance with the present invention supports the aggregation of non-contiguous channels, a link quality of each channel may be significantly different. In this case, it is preferred to allocate a different MCS to each of the aggregated non-contiguous channels. Thus, the present invention proposes to separately configure an MCS for each channel when channels are aggregated, whereby an STA can perform link adaptation efficiently.

Meanwhile, when an STA performs channel bonding operation or single channel operation, an MCS field for a secondary channel can be used for a different purpose or as a reserved bit.

The EDMG Header-A field can include various contents as shown in Table 2.

TABLE 2

| Field name | Start bit | Num. of bits | Description |
| --- | --- | --- | --- |
| SU/MU | 0 | 1 | Indicates whether the PPDU is sent SU or MU |
| BW | | 6 (TBD) | |
| Primary channel | | | |
| GI/CP length | | 2 | 0 - Normal GI/CP, 1 - Short GI/CP 2 - Long GI/CP, 3 - Reserved |
| PSDU length | | 22 | Indicates the length of the EDMG PSDU in octets. |
| Beamformed | | 1 | If set to 1, indicates that per-carrier beamforming is used. Otherwise, set to 0. |
| Short/Long LDPC | | 1 | 0 - 672 codeword, 1 - 1344 codeword |
| Num. of SS | | 3 (TBD) | Indicates the number of spatial streams |

TABLE 2-continued

| Field name | Start bit | Num. of bits | Description |
|---|---|---|---|
| MCS | | 12 (TBD) | Contains an EDMG MCS index used for spatial streams. We assumed there are 2 different MCSs for SU-MIMO. |
| Secondary channel MCS | | 12 (TBD) | When channel aggregation is used, contains an EDMG MCS index of secondary channel. We assumed there are 2 different MCSs for SU-MIMO in secondary channel. The field can be used for other purposes when BW field does not indicate channel aggregation |
| CRC | | 16 | |
| Reserved | | 36 | |
| total | | 112 | |

As shown in Table 2, the EDMG Header-A field in accordance with the present invention can include an MCS field and the MCS field can contain MCS information on streams in the SU-MIMO situation. In Table 2, it is assumed that one MCS is configured with six bits and the maximum number of MCS types that can be supported in the SU-MIMO situation is two.

In addition, the EDMG Header-A field in accordance with the present invention can include a secondary channel MCS field and the secondary channel MCS field can contain MCS information on a secondary channel when the channel aggregation is performed. Similar to the above case, it is assumed that one MCS is configured with six bits and the maximum number of MCS types that can be supported in the SU-MIMO situation is two.

Meanwhile, considering that the main purpose of the channel aggregation is to decrease hardware complexity and improve efficiency as described above, the STA performing the channel aggregation may be a low-specification terminal with a low capability. Therefore, the present invention proposes to configure the EDMG Header-A field in consideration of the above-described method for the MIMO and channel aggregation as shown in Table 3.

TABLE 3

| Field name | Start bit | Num. of bits | Description |
|---|---|---|---|
| SU/MU | 0 | 1 | Indicates whether the PPDU is sent SU or MU |
| BW Primary channel | | 6 (TBD) | |
| GI/CP length | | 2 | 0 - Normal GI/CP, 1 - Short GI/CP 2 - Long GI/CP, 3 - Reserved |
| PSDU length | | 22 | Indicates the length of the EDMG PSDU in octets. |
| Beamformed | | 1 | If set to 1, indicates that per-carrier beamforming is used. Otherwise, set to 0. |
| Short/Long LDPC | | 1 | 0 - 672 codeword, 1 - 1344 codeword |
| Num. of SS | | 3 (TBD) | Indicates the number of spatial streams |
| MCS | | 6 (TBD) | Contains an EDMG MCS index used for spatial streams. |
| Second MCS | | 6 (TBD) | When channel aggregation is used, contains an EDMG MCS index of secondary channel. When channel aggregation is not used, contains an EDMG MCS index used for spatial streams for SU-MIMO |
| CRC | | 16 | |
| Reserved | | 48 | |
| total | | 112 | |

As another embodiment, Table 3 proposes a structure including MCS and Second MCS fields by combining the proposed method for the MIMO and channel aggregation.

In this case, the MCS field indicates information on a first MCS set for the SU-MIMO.

In addition, the Second MCS field may be differently interpreted depending on BW information. That is, it can be interpreted in a different way depending on whether a corresponding PPDU is transmitted through the channel aggregation. For example, when the corresponding PPDU is transmitted through SU-MIMO transmission based on a single channel or SU-MIMO transmission based on channel bonding, the Second MCS field could be interpreted as indication of an MCS (set) for some streams. As another example, when the PPDU is transmitted through the channel aggregation, the Second MCS field could be interpreted as indication of MCS information on a secondary (second) channel.

Thus, in the case of the SU-MIMO transmission based on the channel aggregation, streams of each channel may have the same MCS information. In addition, MCS information on all streams through the primary channel may be indicated by the MCS field and MCS information on all streams through the secondary channel may be indicated by the Second MCS field.

Although Table 3 shows the EDMG Header-A configuration where the number of maximum pieces of MCS information is limited to two regardless of the SU-MIMO or channel aggregation, it is apparent that the number of maximum pieces of MCS information in accordance with the present invention is extended up to four. Moreover, in this case, if a PPDU is transmitted based on the channel aggregation, the maximum number of MCSs that can be allocated to each channel can be two.

3. Proposed Mapping Method for Each Spatial Stream

As described above, in the case of the SU-MIMO, the number of MCSs defined for a spatial stream can be set to anything between one to four.

If one MCS is configured for each spatial stream, output of one low-density parity-check (LDPC) encoder can be mapped to spatial streams. Such a configuration can be easily implemented in a round robin manner.

In addition, when considering the channel aggregation, the MCS field shown in Table 2 or 3 may include an MCS level for each aggregated channel.

Further, when beams are transmitted in different directions, it may reduce spatial correlation but in this case, a path loss may be different in each direction. Thus, a plurality of MCSs may be required in each spatial stream.

Therefore, the present invention proposes that a plurality of MCSs can be defined for spatial streams. For example, two different MCSs can be defined for spatial streams in consideration of hardware complexity but the method proposed in the present invention is not limited thereto. Hereinafter, for convenience of description, the invention is explained by taking as an example a case where up to two pieces of MCS information are configured for spatial streams.

When the number of maximum pieces of MCS information is set to two as described above, it is necessary to define how MCSs are mapped to each spatial stream. In this case, a mapping method can be explicitly indicated but additional indication bits may be required. Alternatively, the mapping method can be implicitly indicated and in this case, the additional indication bits are not required.

The present invention proposes the following mapping tables.

For example, Table 4 below shows a mapping relationship when up to two different MCSs are applied to each spatial stream. To this end, it is assumed that two LDPC encoders are provided and a different MCS is applied to each LDPC. In the following description, $x^{(m)}(n)$ indicates an $n^{th}$ bit of an $m^{th}$ spatial stream and $c^{(j)}(i)$ indicates an $i^{th}$ output bit of a $j^{th}$ LDPC encoder. Thus, spatial bit streams mapped to first to eighth streams can be defined as $x^{(0)}$, $x^{(1)}$, $x^{(2)}$, $x^{(3)}$, $x^{(4)}$, $x^{(5)}$, $x^{(6)}$, and $x^{(7)}$, respectively. Such a mapping relationship is shown in Table 4 below.

TABLE 4

| Number of spatial stream | Number of MCS | Bits to spatial stream |
|---|---|---|
| 1 | 1 | $x^{(0)}(n) = c^{(0)}(i)$ |
| 2 | 1 | $x^{(0)}(n) = c^{(0)}(2i)$ |
|   |   | $x^{(1)}(n) = c^{(0)}(2i + 1)$ |
| 2 | 2 | $x^{(0)}(n) = c^{(0)}(i)$ |
|   |   | $x^{(1)}(n) = c^{(1)}(i)$ |
| 3 | 1 | $x^{(0)}(n) = c^{(0)}(3i)$ |
|   |   | $x^{(1)}(n) = c^{(0)}(3i + 1)$ |
|   |   | $x^{(2)}(n) = c^{(0)}(3i + 2)$ |
| 3 | 2 | $x^{(0)}(n) = c^{(0)}(i)$ |
|   |   | $x^{(1)}(n) = c^{(1)}(2i)$ |
|   |   | $x^{(2)}(n) = c^{(1)}(2i + 1)$ |
| 4 | 1 | $x^{(0)}(n) = c^{(0)}(4i)$ |
|   |   | $x^{(1)}(n) = c^{(0)}(4i + 1)$ |
|   |   | $x^{(2)}(n) = c^{(0)}(4i + 2)$ |
|   |   | $x^{(3)}(n) = c^{(0)}(4i + 2)$ |
| 4 | 2 | $x^{(0)}(n) = c^{(0)}(2i)$ |
|   |   | $x^{(1)}(n) = c^{(0)}(2i + 1)$ |
|   |   | $x^{(2)}(n) = c^{(1)}(2i)$ |
|   |   | $x^{(3)}(n) = c^{(1)}(2i + 1)$ |
| 5 | 1 | $x^{(0)}(n) = c^{(0)}(5i)$ |
|   |   | $x^{(1)}(n) = c^{(0)}(5i + 1)$ |
|   |   | $x^{(2)}(n) = c^{(0)}(5i + 2)$ |
|   |   | $x^{(3)}(n) = c^{(0)}(5i + 3)$ |
|   |   | $x^{(4)}(n) = c^{(0)}(5i + 4)$ |
| 5 | 2 | $x^{(0)}(n) = c^{(0)}(2i)$ |
|   |   | $x^{(1)}(n) = c^{(0)}(2i + 1)$ |
|   |   | $x^{(2)}(n) = c^{(1)}(3i)$ |
|   |   | $x^{(3)}(n) = c^{(1)}(3i + 1)$ |
|   |   | $x^{(4)}(n) = c^{(1)}(3i + 2)$ |
| 6 | 1 | $x^{(0)}(n) = c^{(0)}(6i)$ |
|   |   | $x^{(1)}(n) = c^{(0)}(6i + 1)$ |
|   |   | $x^{(2)}(n) = c^{(0)}(6i + 2)$ |
|   |   | $x^{(3)}(n) = c^{(0)}(6i + 3)$ |
|   |   | $x^{(4)}(n) = c^{(0)}(6i + 4)$ |
|   |   | $x^{(5)}(n) = c^{(0)}(6i + 5)$ |
| 6 | 2 | $x^{(0)}(n) = c^{(0)}(3i)$ |
|   |   | $x^{(1)}(n) = c^{(0)}(3i + 1)$ |
|   |   | $x^{(2)}(n) = c^{(0)}(3i + 2)$ |
|   |   | $x^{(3)}(n) = c^{(1)}(3i)$ |
|   |   | $x^{(4)}(n) = c^{(1)}(3i + 1)$ |
|   |   | $x^{(5)}(n) = c^{(1)}(3i + 2)$ |
| 7 | 1 | $x^{(0)}(n) = c^{(0)}(7i)$ |
|   |   | $x^{(1)}(n) = c^{(0)}(7i + 1)$ |
|   |   | $x^{(2)}(n) = c^{(0)}(7i + 2)$ |
|   |   | $x^{(3)}(n) = c^{(0)}(7i + 3)$ |
|   |   | $x^{(4)}(n) = c^{(0)}(7i + 4)$ |
|   |   | $x^{(5)}(n) = c^{(0)}(7i + 5)$ |
|   |   | $x^{(6)}(n) = c^{(0)}(7i + 6)$ |
| 7 | 2 | $x^{(0)}(n) = c^{(0)}(3i)$ |
|   |   | $x^{(1)}(n) = c^{(0)}(3i + 1)$ |
|   |   | $x^{(2)}(n) = c^{(0)}(3i + 2)$ |
|   |   | $x^{(3)}(n) = c^{(1)}(4i)$ |
|   |   | $x^{(4)}(n) = c^{(1)}(4i + 1)$ |
|   |   | $x^{(5)}(n) = c^{(1)}(4i + 2)$ |
|   |   | $x^{(6)}(n) = c^{(1)}(4i + 3)$ |
| 8 | 1 | $x^{(0)}(n) = c^{(0)}(8i)$ |
|   |   | $x^{(1)}(n) = c^{(0)}(8i + 1)$ |
|   |   | $x^{(2)}(n) = c^{(0)}(8i + 2)$ |
|   |   | $x^{(3)}(n) = c^{(0)}(8i + 3)$ |
|   |   | $x^{(4)}(n) = c^{(0)}(8i + 4)$ |
|   |   | $x^{(5)}(n) = c^{(0)}(8i + 5)$ |
|   |   | $x^{(6)}(n) = c^{(0)}(8i + 6)$ |
|   |   | $x^{(7)}(n) = c^{(0)}(8i + 7)$ |
| 8 | 2 | $x^{(0)}(n) = c^{(0)}(4i)$ |
|   |   | $x^{(1)}(n) = c^{(0)}(4i + 1)$ |
|   |   | $x^{(2)}(n) = c^{(0)}(4i + 2)$ |
|   |   | $x^{(3)}(n) = c^{(0)}(4i + 3)$ |
|   |   | $x^{(4)}(n) = c^{(1)}(4i)$ |
|   |   | $x^{(5)}(n) = c^{(1)}(4i + 1)$ |
|   |   | $x^{(6)}(n) = c^{(1)}(4i + 2)$ |
|   |   | $x^{(7)}(n) = c^{(1)}(4i + 3)$ |

In this case, if an output value of the same LDPC encoder is applied to different spatial streams, the mapping method can be changed according to a round robin method.

Figure 11:
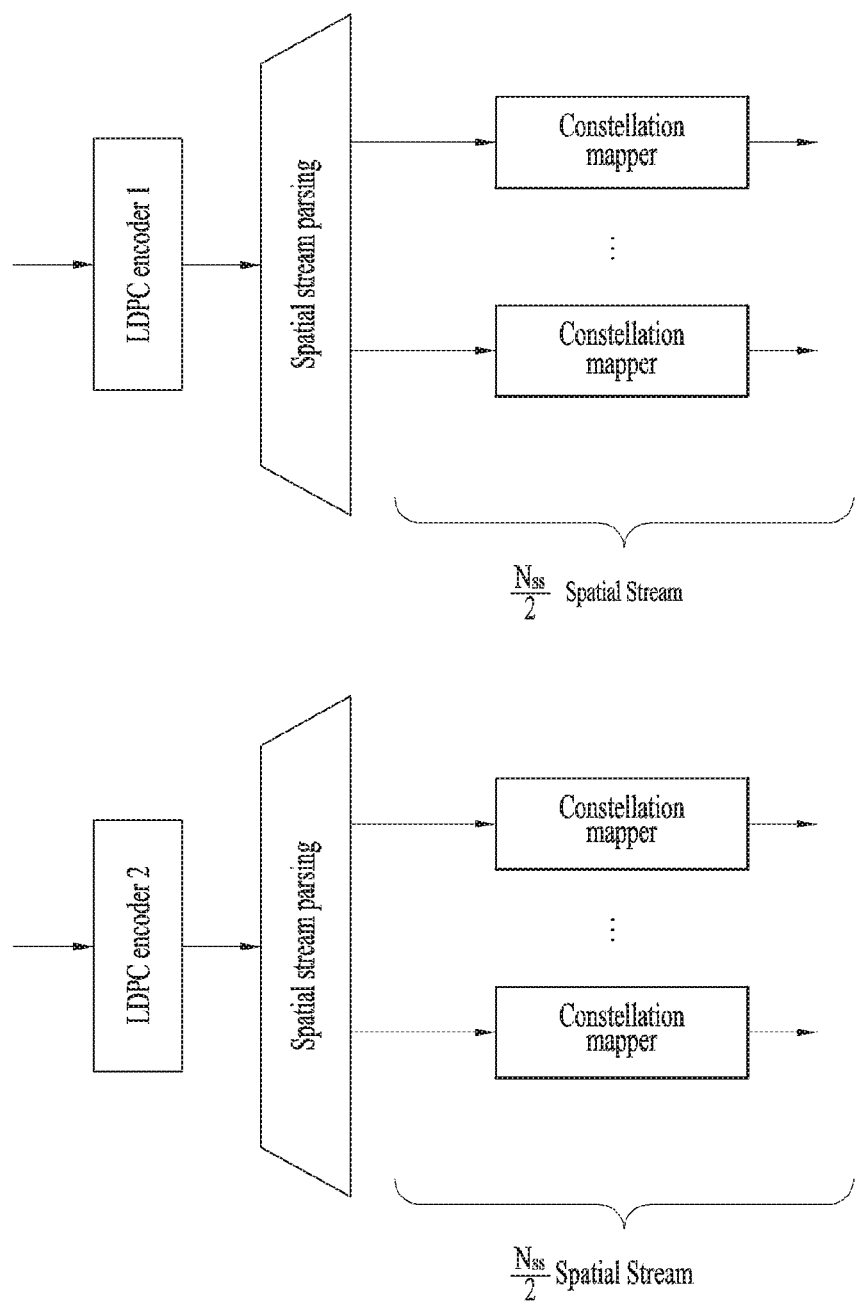
FIG. 11 is a diagram illustrating a configuration of each LDPC encoder when there are two LDPC encoders and an even number of spatial streams according to the present invention and FIG. 12 is a diagram illustrating a configuration of each LDPC encoder when there are two LDPC encoders and an odd number of spatial streams.
Figure 12:
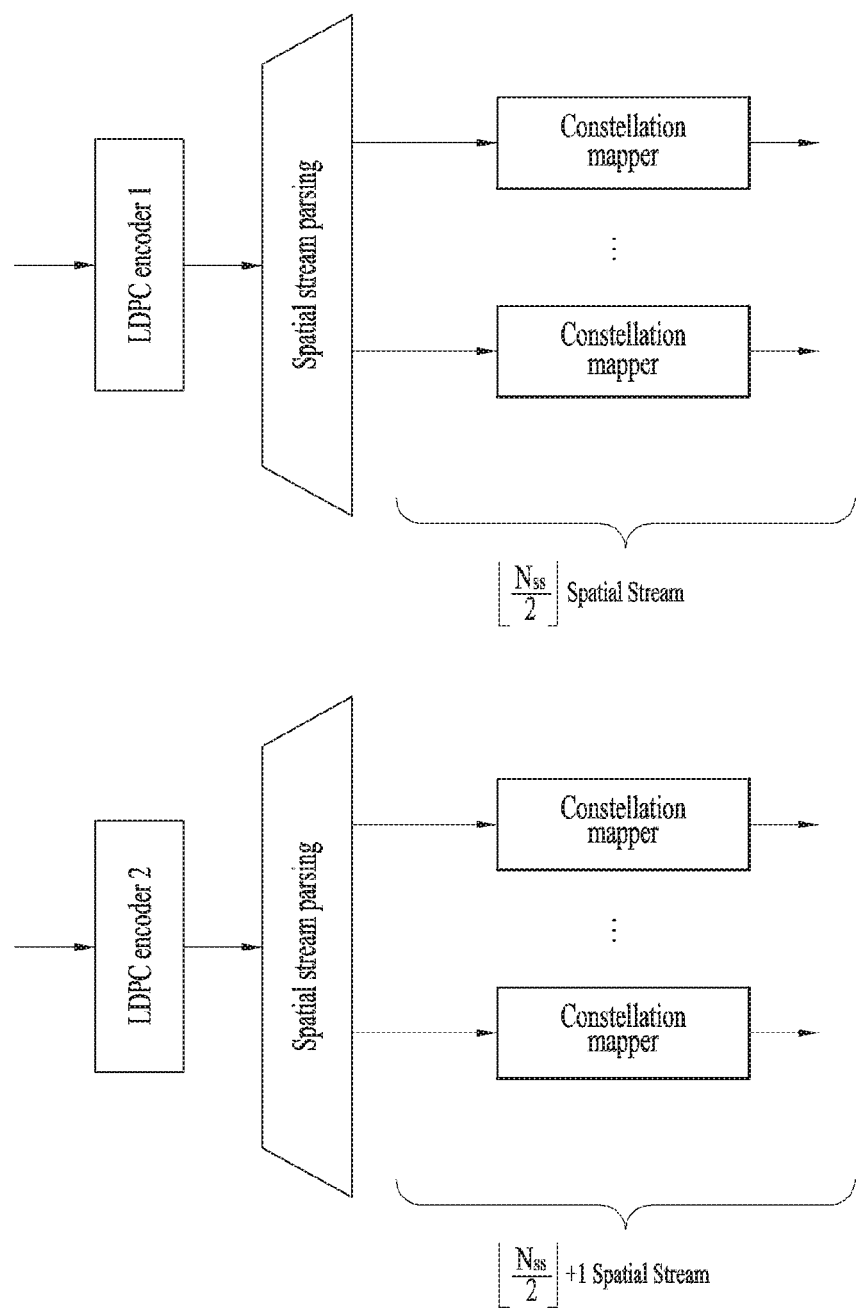

In addition, a relationship between spatial streams in each LDPC encoder can be established as shown in FIG. 11 or 12.

FIG. 11 is a diagram illustrating a configuration of each LDPC encoder when there are two LDPC encoders and an even number of spatial streams according to the present invention and FIG. 12 is a diagram illustrating a configuration of each LDPC encoder when there are two LDPC encoders and an odd number of spatial streams.

In FIGS. 11 and 12, each stream parser can have up to four streams and operate in a round robin manner.

In addition, considering that the object of the present invention is to provide the EDMG Header-A field for simultaneously supporting the SU-MIMO and channel aggregation operations, when two different MCSs are applied to a spatial stream, the EDMG Header-A field can be configured with one of the following two options.

First, according to the first option, the total number of MCSs can be set to two regardless of the channel aggregation. In addition, in the case of the channel aggregation operation, one MCS can be used for a spatial stream and thus, the EDMG Header-A field in accordance with the present invention can always include two MCS fields.

Alternatively, according to the second option, the total number of MCSs when the channel aggregation is used can be set to four. In addition, in the case of the channel aggregation operation, two MCSs can be used for a spatial stream in each aggregated channel and thus, the EDMG Header-A field in accordance with the present invention can always include four MCS fields Additionally, when there are up to four pieces of MCS information, an MCS mapping relationship for each stream in accordance with the present invention can be defined as shown in Table 5 below. To this end, it is assumed that four LDPC encoders are provided and a different MCS is applied to each LDPC. Similarly, in the following description, $x^{(m)}(n)$ indicates an $n^{th}$ bit of an $m^{th}$ spatial stream and $c^{(j)}(i)$ indicates an $i^{th}$ output bit of a $j^{th}$ LDPC encoder. Thus, spatial bit streams mapped to first to eighth $i^{th}$ streams can be defined as $x^{(0)}$, $x^{(1)}$, $x^{(2)}$, $x^{(3)}$, $x^{(4)}$, $x^{(5)}$, $x^{(6)}$, and $x^{(7)}$, respectively. Table 5 shows Such a mapping relationship.

TABLE 5

| Number of spatial stream | Number of MCS | Bits to spatial stream |
|---|---|---|
| 1 | 1 | $x^{(0)}(n) = c^{(0)}(i)$ |
| 2 | 1 | $x^{(0)}(n) = c^{(0)}(2i)$ |
|   |   | $x^{(1)}(n) = c^{(0)}(2i + 1)$ |
| 2 | 2 | $x^{(0)}(n) = c^{(0)}(i)$ |
|   |   | $x^{(1)}(n) = c^{(1)}(i)$ |

TABLE 5-continued

| Number of spatial stream | Number of MCS | Bits to spatial stream |
|---|---|---|
| 3 | 1 | $x^{(0)}(n) = c^{(0)}(3i)$ <br> $x^{(1)}(n) = c^{(0)}(3i+1)$ <br> $x^{(2)}(n) = c^{(0)}(3i+2)$ |
| 3 | 2 | $x^{(0)}(n) = c^{(0)}(i)$ <br> $x^{(1)}(n) = c^{(1)}(2i)$ <br> $x^{(2)}(n) = c^{(1)}(2i+1)$ |
| 3 | 3 | $x^{(0)}(n) = c^{(0)}(i)$ <br> $x^{(1)}(n) = c^{(1)}(i)$ <br> $x^{(2)}(n) = c^{(2)}(i)$ |
| 4 | 1 | $x^{(0)}(n) = c^{(0)}(4i)$ <br> $x^{(1)}(n) = c^{(0)}(4i+1)$ <br> $x^{(2)}(n) = c^{(0)}(4i+2)$ <br> $x^{(3)}(n) = c^{(0)}(4i+2)$ |
| 4 | 2 | $x^{(0)}(n) = c^{(0)}(2i)$ <br> $x^{(1)}(n) = c^{(0)}(2i+1)$ <br> $x^{(2)}(n) = c^{(1)}(2i)$ <br> $x^{(3)}(n) = c^{(1)}(2i+1)$ |
| 4 | 3 | $x^{(0)}(n) = c^{(0)}(i)$ <br> $x^{(1)}(n) = c^{(1)}(i)$ <br> $x^{(2)}(n) = c^{(2)}(2i)$ <br> $x^{(3)}(n) = c^{(2)}(2i+1)$ |
| 4 | 4 | $x^{(0)}(n) = c^{(0)}(i)$ <br> $x^{(1)}(n) = c^{(1)}(i)$ <br> $x^{(2)}(n) = c^{(2)}(i)$ <br> $x^{(3)}(n) = c^{(3)}(i)$ |
| 5 | 1 | $x^{(0)}(n) = c^{(0)}(5i)$ <br> $x^{(1)}(n) = c^{(0)}(5i+1)$ <br> $x^{(2)}(n) = c^{(0)}(5i+2)$ <br> $x^{(3)}(n) = c^{(0)}(5i+3)$ <br> $x^{(4)}(n) = c^{(0)}(5i+4)$ |
| 5 | 2 | $x^{(0)}(n) = c^{(0)}(2i)$ <br> $x^{(1)}(n) = c^{(0)}(2i+1)$ <br> $x^{(2)}(n) = c^{(1)}(3i)$ <br> $x^{(3)}(n) = c^{(1)}(3i+1)$ <br> $x^{(4)}(n) = c^{(1)}(3i+2)$ |
| 5 | 3 | $x^{(0)}(n) = c^{(0)}(i)$ <br> $x^{(1)}(n) = c^{(1)}(2i)$ <br> $x^{(2)}(n) = c^{(1)}(2i+1)$ <br> $x^{(3)}(n) = c^{(2)}(2i)$ <br> $x^{(4)}(n) = c^{(2)}(2i+1)$ |
| 5 | 4 | $x^{(0)}(n) = c^{(0)}(i)$ <br> $x^{(1)}(n) = c^{(1)}(i)$ <br> $x^{(2)}(n) = c^{(2)}(i)$ <br> $x^{(3)}(n) = c^{(3)}(2i)$ <br> $x^{(4)}(n) = c^{(3)}(2i+1)$ |
| 6 | 1 | $x^{(0)}(n) = c^{(0)}(6i)$ <br> $x^{(1)}(n) = c^{(0)}(6i+1)$ <br> $x^{(2)}(n) = c^{(0)}(6i+2)$ <br> $x^{(3)}(n) = c^{(0)}(6i+3)$ <br> $x^{(4)}(n) = c^{(0)}(6i+4)$ <br> $x^{(5)}(n) = c^{(0)}(6i+5)$ |
| 6 | 2 | $x^{(0)}(n) = c^{(0)}(3i)$ <br> $x^{(1)}(n) = c^{(0)}(3i+1)$ <br> $x^{(2)}(n) = c^{(0)}(3i+2)$ <br> $x^{(3)}(n) = c^{(1)}(3i)$ <br> $x^{(4)}(n) = c^{(1)}(3i+1)$ <br> $x^{(5)}(n) = c^{(1)}(3i+2)$ |
| 6 | 3 | $x^{(0)}(n) = c^{(0)}(2i)$ <br> $x^{(1)}(n) = c^{(0)}(2i+1)$ <br> $x^{(2)}(n) = c^{(1)}(2i)$ <br> $x^{(3)}(n) = c^{(1)}(2i+1)$ <br> $x^{(4)}(n) = c^{(2)}(2i)$ <br> $x^{(5)}(n) = c^{(2)}(2i+1)$ |
| 6 | 4 | $x^{(0)}(n) = c^{(0)}(i)$ <br> $x^{(1)}(n) = c^{(1)}(i)$ <br> $x^{(2)}(n) = c^{(2)}(2i)$ <br> $x^{(3)}(n) = c^{(2)}(2i+1)$ <br> $x^{(4)}(n) = c^{(3)}(2i)$ <br> $x^{(5)}(n) = c^{(3)}(2i+1)$ |
| 7 | 1 | $x^{(0)}(n) = c^{(0)}(7i)$ <br> $x^{(1)}(n) = c^{(0)}(7i+1)$ <br> $x^{(2)}(n) = c^{(0)}(7i+2)$ <br> $x^{(3)}(n) = c^{(0)}(7i+3)$ <br> $x^{(4)}(n) = c^{(0)}(7i+4)$ <br> $x^{(5)}(n) = c^{(0)}(7i+5)$ <br> $x^{(6)}(n) = c^{(0)}(7i+6)$ |
| 7 | 2 | $x^{(0)}(n) = c^{(0)}(3i)$ <br> $x^{(1)}(n) = c^{(0)}(3i+1)$ <br> $x^{(2)}(n) = c^{(0)}(3i+2)$ <br> $x^{(3)}(n) = c^{(1)}(4i)$ <br> $x^{(4)}(n) = c^{(1)}(4i+1)$ <br> $x^{(5)}(n) = c^{(1)}(4i+2)$ <br> $x^{(6)}(n) = c^{(1)}(4i+3)$ |
| 7 | 3 | $x^{(0)}(n) = c^{(0)}(2i)$ <br> $x^{(1)}(n) = c^{(0)}(2i+1)$ <br> $x^{(2)}(n) = c^{(1)}(2i)$ <br> $x^{(3)}(n) = c^{(1)}(2i+1)$ <br> $x^{(4)}(n) = c^{(2)}(3i)$ <br> $x^{(5)}(n) = c^{(2)}(3i+1)$ <br> $x^{(6)}(n) = c^{(2)}(3i+2)$ |
| 7 | 4 | $x^{(0)}(n) = c^{(0)}(i)$ <br> $x^{(1)}(n) = c^{(1)}(2i)$ <br> $x^{(2)}(n) = c^{(1)}(2i+1)$ <br> $x^{(3)}(n) = c^{(2)}(2i)$ <br> $x^{(4)}(n) = c^{(2)}(2i+1)$ <br> $x^{(5)}(n) = c^{(3)}(2i)$ <br> $x^{(6)}(n) = c^{(3)}(2i+1)$ |
| 8 | 1 | $x^{(0)}(n) = c^{(0)}(8i)$ <br> $x^{(1)}(n) = c^{(0)}(8i+1)$ <br> $x^{(2)}(n) = c^{(0)}(8i+2)$ <br> $x^{(3)}(n) = c^{(0)}(8i+3)$ <br> $x^{(4)}(n) = c^{(0)}(8i+4)$ <br> $x^{(5)}(n) = c^{(0)}(8i+5)$ <br> $x^{(6)}(n) = c^{(0)}(8i+6)$ <br> $x^{(7)}(n) = c^{(0)}(8i+7)$ |
| 8 | 2 | $x^{(0)}(n) = c^{(0)}(4i)$ <br> $x^{(1)}(n) = c^{(0)}(4i+1)$ <br> $x^{(2)}(n) = c^{(0)}(4i+2)$ <br> $x^{(3)}(n) = c^{(0)}(4i+3)$ <br> $x^{(4)}(n) = c^{(1)}(4i)$ <br> $x^{(5)}(n) = c^{(1)}(4i+1)$ <br> $x^{(6)}(n) = c^{(1)}(4i+2)$ <br> $x^{(7)}(n) = c^{(1)}(4i+3)$ |
| 8 | 3 | $x^{(0)}(n) = c^{(0)}(2i)$ <br> $x^{(1)}(n) = c^{(0)}(2i+1)$ <br> $x^{(2)}(n) = c^{(1)}(3i)$ <br> $x^{(3)}(n) = c^{(1)}(3i+1)$ <br> $x^{(4)}(n) = c^{(1)}(3i+2)$ <br> $x^{(5)}(n) = c^{(2)}(3i)$ <br> $x^{(6)}(n) = c^{(2)}(3i+1)$ <br> $x^{(7)}(n) = c^{(2)}(3i+2)$ |
| 8 | 4 | $x^{(0)}(n) = c^{(0)}(2i)$ <br> $x^{(1)}(n) = c^{(0)}(2i+1)$ <br> $x^{(2)}(n) = c^{(1)}(2i)$ <br> $x^{(3)}(n) = c^{(1)}(2i+1)$ <br> $x^{(4)}(n) = c^{(2)}(2i)$ <br> $x^{(5)}(n) = c^{(2)}(2i+1)$ <br> $x^{(6)}(n) = c^{(3)}(2i)$ <br> $x^{(7)}(n) = c^{(3)}(2i+1)$ |

Meanwhile, according to the present invention, the number of spatial streams among the contents contained in the EDMG Header-A field can be utilized as common information for each channel when the channel aggregation operation is performed. That is, channels used in the channel aggregation may have the same number of streams. Alternatively, a different number of spatial streams may be allocated for each of the aggregated channels by configuring a separate (additional) field for indicating the number of spatial streams.

Hereinafter, STA's operations in accordance with the proposed signal transmission and reception method will be described. Particularly, a description is made on the assumption that an STA transmits and receives signals with another STA through aggregation of two channels (i.e., first and second channels).

First, an STA that intends to transmit a signal transmits a header field including 2*N (where N is a positive integer) pieces of MCS information to a station that intends to receive the signal. In this case, the EDMG Header-A field shown in FIG. 9 or 10 may be used.

Next, the signal transmitting STA maps output bit values of N LDPC encoders corresponding to N pieces of MCS information among the 2*N pieces of MCS information included in the header field to spatial stream sequences of each spatial stream in the first channel based on a mapping table defined by a relationship between the number of spatial streams in the first channel of the aggregated channels and half (i.e., N) the pieces (i.e., 2*M) of MCS information included in the header field. Similarly, the signal transmitting STA maps output bit values of N LDPC encoders corresponding to the remaining N pieces of MCS information among the 2*N pieces of MCS information included in the header field to spatial stream sequences of each spatial stream in the second channel based on a mapping table defined by a relationship between the number of spatial streams in the second channel of the aggregated channels and half (i.e., N) the pieces (i.e., 2*M) of MCS information included in the header field.

Thereafter, the signal transmitting STA transmits the mapped spatial stream sequences through spatial streams in each corresponding channel to the signal receiving STA.

In this case, a maximum number of spatial streams in each channel (i.e., first or second channel) can be set to 4.

In addition, the number of the spatial streams in the first channel may be set to be equal to that in the second channel. In this case, the signal transmitting STA may transmit information on the number of common spatial streams as information indicating the number of spatial streams in each channel to the signal receiving STA.

As another example, when the number of the spatial streams in the first channel is set to be different from that in the second channel, the signal transmitting STA may transmit information on the numbers of spatial streams in the individual channels to the signal receiving STA.

Referring to the aforementioned example, the information on the number of spatial streams in each channel can be transmitted through the header field (e.g., EDMG Header-A field).

As a particular example, the integer N can be set to 2. In this case, depending on whether the number of spatial streams in each of the aggregated channels (either the first or second channel) is an even number or an odd number, the number of spatial streams to which an output bit value of a first LDPC encoder corresponding first MCS information of two pieces of MCS information corresponding to a certain channel (either the first or second channel) is mapped may be set to be equal to or different from that to which an output bit value of a second LDPC encoder corresponding to the second MCS information of the two pieces of MCS information corresponding to either the first or second channel is mapped.

In detail, when the integer N is set to 2 and the number (Nss) of the spatial streams in each channel (either the first or second channel) is the odd number, the output bit value of the first LDPC encoder corresponding to the first MCS information of the two pieces of MCS information corresponding to either the first or second channel may be mapped to $$\left\lfloor \frac{N_{ss}}{2} \right\rfloor$$

spatial streams, and the output bit value of the second LDPC encoder corresponding to the second MCS information of the two pieces of MCS information corresponding to either the first or second channel may be mapped to $$\left\lfloor \frac{N_{ss}}{2} \right\rfloor + 1$$

spatial streams. In this case, $\lfloor x \rfloor$ indicates an integer equal to or smaller than x.

Moreover, when the integer N is set to 2 and the number (Nss) of the spatial streams in each channel (either the first or second channel) is the even number, the output bit value of the first LDPC encoder corresponding to the first MCS information of the two pieces of MCS information corresponding to either the first or second channel and the output bit value of the second LDPC encoder corresponding to the second MCS information of the two pieces of MCS information corresponding to either the first or second channel may be mapped to $$\left\lfloor \frac{N_{ss}}{2} \right\rfloor$$

spatial streams.

In this case, if the number of spatial streams in each channel to which the output bit value of the first LDPC encoder or the output bit value of the second LDPC encoder is mapped is equal to or greater than 2, the output bit value of each of the first and second LDPC encoders may be mapped to the two or more spatial streams in each channel according to a round robin method.

In response to the above-mentioned operations of the signal transmitting STA, the signal receiving STA can perform the following operations.

First, the signal receiving STA receives a header field including 2*N pieces of MCS information from the signal transmitting STA.

Next, the signal receiving STA receives spatial stream sequences in each channel through spatial streams in each corresponding channel from the signal transmitting STA.

Thereafter, the signal receiving STA can obtain output bit values of LDPC encoders corresponding to the received MCS information from the received spatial stream sequences in each channel using the received MCS information.

More particularly, the signal receiving STA can obtain output bit values of N LDPC encoders corresponding to N pieces of MCS information among the 2*N pieces MCS information from spatial stream sequences of each spatial stream in one of the aggregated channels (e.g., first channel) based on a mapping table defined by a relationship between the number of spatial streams in the one channel and the integer N.

Similarly, the signal receiving STA can obtain output bit values of N LDPC encoders corresponding to remaining N pieces of MCS information among the 2*N pieces of MCS information from spatial stream sequences of each spatial stream in the other one of the aggregated channels (e.g., second channel) based on a mapping table defined by a relationship between the number of spatial streams in the other channel and the integer N.

4. Device Configuration

Figure 13:
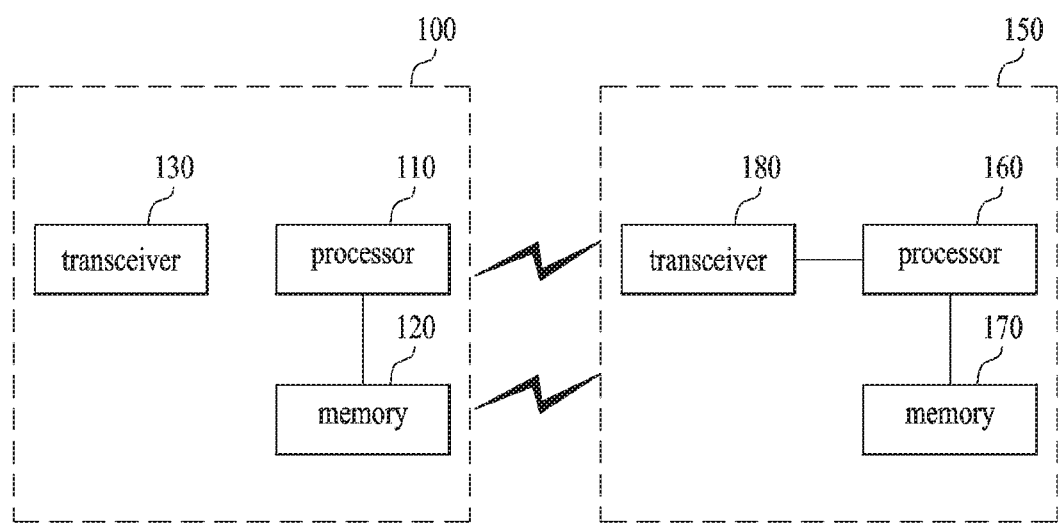
FIG. 13 is a diagram illustrating devices for implementing the above-mentioned methods.

FIG. 13 is a diagram illustrating devices for implementing the above-described method.

In FIG. 13, a wireless device 100 may correspond to an STA that transmits a signal using the above-described EDMG Header-A field and a wireless device 150 may correspond to an STA that receives a signal using the above-described EDMG Header-A field. In this case, each of the STAs may be an 11ay user equipment or PCP/AP. Hereinafter, for convenience of description, the signal transmitting STA is referred to as a transmitting device 100 and the signal receiving STA is referred to as a receiving device 150.

The transmission device 100 may include a processor 110, a memory 120 and a transceiver 130. The reception device 150 may include a processor 160, a memory 170, and a transceiver 180. The transceivers 130 and 180 may transmit/receive wireless signals and may be implemented in a physical layer such as IEEE 802.11/3GPP. The processors 110 and 160 are implemented in the physical layer and/or MAC layer and are connected to the transceivers 130 and 180. The processors 110 and 160 may perform the UL MU scheduling procedure described above.

The processors 110 and 160 and/or the transceivers 130 and 180 may include application specific integrated circuits (ASICs), other chipsets, logic circuits, and/or data processors. The memories 120 and 170 may include a read-only memory (ROM), a random access memory (RAM), a flash memory, a memory card, a storage medium and/or other storage units. When an embodiment is executed by software, the method described above may be executed as a module (e.g., a process, a function) that performs the functions described above. The module may be stored in the memory 120,170 and executed by the processor 110,160. The memory 120, 170 may be located inside or outside the processor 110, 160 and may be connected to the processor 110, 160 by a well-known means.

The detailed description of preferred embodiments of the invention set forth above is provided to enable those skilled in the art to implement and practice the invention. Although the present invention has been fully described by way of example with reference to the accompanying drawings, it is to be understood that various modifications and changes may be made in the invention without departing from the scope and spirit of the invention. Accordingly, the present invention is not intended to be limited to the embodiments disclosed herein but is to be accorded the widest scope consistent with the principles and novel features disclosed herein.

What is claimed is:

1. A method performed by a first station (STA) for transmitting a signal to a second STA through channel aggregation of a first channel and a second channel in a wireless local area network (WLAN) system, the method comprising:

transmitting a header field including 2*N (where N is a positive integer) pieces of modulation and coding scheme (MCS) information to the second STA;

mapping output bit values of N low-density parity-check (LDPC) encoders corresponding to N pieces of MCS information among the 2*N pieces of MCS information to spatial stream sequences of each spatial stream in the first channel based on a mapping table defined by a relationship between the number of spatial streams in the first channel and the integer N;

mapping output bit values of N LDPC encoders corresponding to remaining N pieces of MCS information among the 2*N pieces of MCS information to spatial stream sequences of each spatial stream in the second channel based on a mapping table defined by a relationship between the number of spatial streams in the second channel and the integer N; and transmitting the mapped spatial stream sequences through spatial streams in each corresponding channel to the second STA.

2. The method of claim 1, wherein a maximum number of spatial streams in each channel is 4.

3. The method of claim 1, wherein the number of the spatial streams in the first channel is equal to that in the second channel.

4. The method of claim 3, further comprising transmitting information on the number of common spatial streams as information indicating the number of spatial streams in each channel to the second STA.

5. The method of claim 1, further comprising transmitting information on the numbers of spatial streams in the individual channels as information indicating the number of spatial streams in each channel to the second STA.

6. The method of claim 1, wherein when the integer N is 2, depending on whether the number of the spatial streams in either the first or second channel is an odd number or an even number, the number of spatial streams to which an output bit value of a first LDPC encoder corresponding first MCS information of two pieces of MCS information corresponding to either the first or second channel is mapped is either equal to or different from that to which an output bit value of a second LDPC encoder corresponding to second MCS information of the two pieces of MCS information corresponding to the either first or second channel is mapped.

7. The method of claim 6, wherein when the integer N is 2 and the number (Nss) of the spatial streams in either the first or second channel is the odd number, the output bit value of the first LDPC encoder corresponding to the first MCS information of the two pieces of MCS information corresponding to either the first or second channel is mapped to $$\left\lfloor \frac{N_{ss}}{2} \right\rfloor$$

spatial streams, and the output bit value of the second LDPC encoder corresponding to the second MCS information of the two pieces of MCS information corresponding to either the first or second channel is mapped to $$\left\lfloor \frac{N_{ss}}{2} \right\rfloor + 1$$

spatial streams, where $\lfloor x \rfloor$ indicates an integer equal to or smaller than x.

8. The method of claim 6, wherein when the integer N is 2 and the number (Nss) of the spatial streams in either the first or second channel is the even number, the output bit value of the first LDPC encoder corresponding to the first MCS information of the two pieces of MCS information corresponding to either the first or second channel and the output bit value of the second LDPC encoder corresponding to the second MCS information of the two pieces of MCS information corresponding to the either the first or second channel is mapped to $$\left\lfloor \frac{N_{ss}}{2} \right\rfloor$$

spatial streams.

9. The method of claim 7, wherein when the number of spatial streams in each channel to which the output bit value of the first LDPC encoder or the output bit value of the second LDPC encoder is mapped is equal to or greater than 2, the output bit value of each of the first and second LDPC encoders is mapped to the two or more spatial streams in each channel according to a round robin method.

10. The method of claim 8, wherein when the number of spatial streams in each channel to which the output bit value of the first LDPC encoder or the output bit value of the second LDPC encoder is mapped is equal to or greater than 2, the output bit value of each of the first and second LDPC encoders is mapped to the two or more spatial streams in each channel according to a round robin method.

11. A method performed by a first station (STA) for receiving a signal from a second STA through channel aggregation of a first channel and a second channel in a wireless local area network (WLAN) system, the method comprising:
receiving a header field including 2*N (where N is a positive integer) pieces of modulation and coding scheme (MCS) information from the second STA;
receiving spatial stream sequences in each channel through spatial streams in each corresponding channel from the second STA;
obtaining output bit values of N low-density parity-check (LDPC) encoders corresponding to N pieces of MCS information among the 2*N pieces of MCS information from spatial stream sequences of each spatial stream in the first channel based on a mapping table defined by a relationship between the number of spatial streams in the first channel and the integer N; and
obtaining output bit values of N LDPC encoders corresponding to remaining N pieces of MCS information among the 2*N pieces of MCS information from spatial stream sequences of each spatial stream in the second channel based on a mapping table defined by a relationship between the number of spatial streams in the second channel and the integer N.

12. The method of claim 11, wherein a maximum number of spatial streams in each channel is 4.

13. The method of claim 11, wherein the number of the spatial streams in the first channel is equal to that in the second channel.

14. The method of claim 13, further comprising receiving information on the number of common spatial streams as information indicating the number of spatial streams in each channel from the second STA.

15. The method of claim 11, further comprising receiving information on the numbers of spatial streams in the individual channels as information indicating the number of spatial streams in each channel from the second STA.

16. A station (STA) device for transmitting a signal through channel aggregation of a first channel and a second channel in a wireless local area network (WLAN) system, the STA device comprising:
a transceiver configured to transmit and receive signals to and from a different STA device with at least one radio frequency (RF) chain; and
a processor configured to be connected to the transceiver and process the signals transmitted and received to and from the different STA device,
wherein the processor is configured to:
transmit a header field including 2*N (where N is a positive integer) pieces of modulation and coding scheme (MCS) information to the different STA;
map output bit values of N low-density parity-check (LDPC) encoders corresponding to N pieces of MCS information among the 2*N pieces of MCS information to spatial stream sequences of each spatial stream in the first channel based on a mapping table defined by a relationship between the number of spatial streams in the first channel and the integer N;
map output bit values of N LDPC encoders corresponding to remaining N pieces of MCS information among the 2*N pieces of MCS information to spatial stream sequences of each spatial stream in the second channel based on a mapping table defined by a relationship between the number of spatial streams in the second channel and the integer N; and
transmit the mapped spatial stream sequences through spatial streams in each corresponding channel to the different STA.

17. A station (STA) device for receiving a signal through channel aggregation of a first channel and a second channel in a wireless local area network (WLAN) system, the STA device comprising:
a transceiver configured to transmit and receive signals to and from a different STA device with at least one radio frequency (RF) chain; and
a processor configured to be connected to the transceiver and process the signals transmitted and received to and from the different STA device,
wherein the processor is configured to:
receive a header field including 2*N (where N is a positive integer) pieces of modulation and coding scheme (MCS) information from the different STA;
receive spatial stream sequences in each channel through spatial streams in each corresponding channel from the different STA;
obtain output bit values of N low-density parity-check (LDPC) encoders corresponding to N pieces of MCS information among the 2*N pieces of MCS information from spatial stream sequences of each spatial stream in the first channel based on a mapping table defined by a relationship between the number of spatial streams in the first channel and the integer N; and
obtain output bit values of N LDPC encoders corresponding to remaining N pieces of MCS information among the 2*N pieces of MCS information from spatial stream sequences of each spatial stream in the second channel based on a mapping table defined by a relationship between the number of spatial streams in the second channel and the integer N.

* * * * *